United States Patent
Kim et al.

(10) Patent No.: US 10,685,454 B2
(45) Date of Patent: Jun. 16, 2020

(54) APPARATUS AND METHOD FOR GENERATING SYNTHETIC TRAINING DATA FOR MOTION RECOGNITION

(71) Applicant: ELECTRONICS AND TELECOMMUNICATIONS RESEARCH INSTITUTE, Daejeon (KR)

(72) Inventors: Young Hee Kim, Daejeon (KR); Jin Seo Kim, Daejeon (KR); Soon Chan Park, Daejeon (KR); Jae Hui Park, Daejeon (KR); Ji Young Park, Daejeon (KR); Kwang Hyun Shim, Daejeon (KR); Moon Wook Ryu, Seoul (KR); Hyuk Jeong, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 16/204,414

(22) Filed: Nov. 29, 2018

(65) Prior Publication Data
US 2019/0295278 A1    Sep. 26, 2019

(30) Foreign Application Priority Data
Mar. 20, 2018  (KR) .................. 10-2018-0031896

(51) Int. Cl.
*G06T 7/579*  (2017.01)
*G06T 11/00*  (2006.01)
(Continued)

(52) U.S. Cl.
CPC ............ *G06T 7/579* (2017.01); *G06T 11/001* (2013.01); *G06T 15/08* (2013.01); *G06T 15/506* (2013.01)

(58) Field of Classification Search
CPC ...... G06T 7/579; G06T 11/001; G06T 15/506; G06T 15/08; G06T 15/50; G06T 11/00;
(Continued)

(56) References Cited

U.S. PATENT DOCUMENTS

| | | | |
|---|---|---|---|
| 2009/0128546 A1 | 5/2009 | Masuda | |
| 2011/0210915 A1* | 9/2011 | Shotton | G06K 9/00369 345/157 |

(Continued)

FOREIGN PATENT DOCUMENTS

KR    10-2016-0138729 A    12/2016

OTHER PUBLICATIONS

Jian Liu et al., "Learning Human Pose Models from Synthesized Data for Robust RGB-D Action Recognition", arXiv:1707.00823v1 [cs.CV] Jul. 4, 2017.

*Primary Examiner* — Xilin Guo
(74) *Attorney, Agent, or Firm* — LRK Patent Law Firm

(57) ABSTRACT

An apparatus and method for generating synthetic training data for motion recognition. The method includes generating a three-dimensional (3D) human body model in real time according to motion of a human body, converting volume data of the 3D human body model into a 3D linear structure and extracting skeletal joint information, generating a data set of a human body image and skeletal joint information by rendering the 3D human body model and the skeletal joint information, and providing the data set of the image and the skeletal joint information as synthetic training data for motion recognition.

19 Claims, 6 Drawing Sheets

(51) Int. Cl.
*G06T 15/50* (2011.01)
*G06T 15/08* (2011.01)

(58) Field of Classification Search
CPC . G06T 2207/30196; G06T 17/00; G06T 7/70;
G06T 13/40; G06T 15/00; G06T 17/10;
G06F 3/0346; G06F 1/1694; G06K
9/00335; G06K 9/6256
See application file for complete search history.

(56) References Cited

U.S. PATENT DOCUMENTS

| | | |
|---|---|---|
| 2012/0148161 A1 | 6/2012 | Kim |
| 2014/0205187 A1 | 7/2014 | Kang et al. |
| 2014/0341428 A1 | 11/2014 | Choi et al. |
| 2016/0125572 A1 | 5/2016 | Yoo et al. |
| 2016/0155262 A1* | 6/2016 | Chen ................. G06T 19/00 345/426 |
| 2017/0034641 A1* | 2/2017 | Meshram ............... H04S 7/303 |
| 2017/0091951 A1 | 3/2017 | Yoo et al. |
| 2017/0169620 A1 | 6/2017 | Bleiweiss et al. |
| 2017/0200313 A1 | 7/2017 | Lee et al. |
| 2017/0330375 A1* | 11/2017 | Chen ................. G06T 17/00 |
| 2019/0082211 A1* | 3/2019 | Vats ................. G06T 13/40 |

\* cited by examiner

APPARATUS AND METHOD FOR GENERATING SYNTHETIC TRAINING DATA FOR MOTION RECOGNITION

CROSS REFERENCE TO RELATED APPLICATION

This application claims priority to Korean Patent Application No. 2018-0031896 filed on Mar. 20, 2018 in the Korean Intellectual Property Office (KIPO), the entire content of which is hereby incorporated by reference.

BACKGROUND

1. Field of the Invention

Example embodiments of the present invention relate to an apparatus and method for generating synthetic training data for motion recognition, and more specifically, to an apparatus and method for generating synthetic training data using multiple depth cameras to recognize a person's motion.

2. Description of Related Art

As image recognition based on deep learning has recently achieved good performance, research is underway in various fields such as self-driving, object recognition, and motion recognition. In addition to this, with the popularization of red green blue depth (RGB-D) sensor cameras, research is being vigorously conducted to extract skeletal joint information of a human body from a depth image or a color image using such a sensor and recognize a motion of the person on the basis of the extracted skeletal joint information or to recognize the motion directly from the image. Recognition of a human body's motion may be used in various applications such as security, monitoring, sport analysis, human-computer interaction, and video search.

An image recognition method based on deep learning requires much data in a training stage, and the amount of data used for training is so important as to determine recognition performance. Therefore, a variety and plenty of training data is required. In many research fields, even the disclosure of favorable data which is required for training becomes an issue. In late few years, creating actual data requires too much resources in terms of cost and time, and thus methods for generating virtual data are being researched.

According to existing methods of generating virtual data, a constructed three-dimensional (3D) human body model and motion data are used to generate virtual data on the basis of a graphics rendering technique. This is very helpful in terms of cost and time compared to the case of using actually captured data, but a problem still remains. Much time and resources are required to precisely construct a virtual human body model like an actual human being and move the virtual model realistically, and also there are limits in putting various clothes on the virtual model.

For example, a skirt may be put on a virtual model. To naturally move the skirt according to motion of the virtual model, a task such as cloth simulation is additionally required. Also, it is not easy to acquire necessary motion data and an adequate amount of motion data. A considerable cost is required to capture and acquire desired motion data with a motion capture (MoCap) system, and when published data such as Carnegie Mellon University (CMU) motion data is used, it may be difficult to find necessary motion data. Motion retargeting for connecting a human body model and motion data also is a task requiring a considerable amount of time.

Consequently, there is a necessity for a method of efficiently generating synthetic training data used for motion recognition at low costs.

SUMMARY

Accordingly, example embodiments of the present invention are provided to substantially obviate one or more problems due to limitations and disadvantages of the related art.

Example embodiments of the present invention provide a method of generating synthetic training data for motion recognition.

Example embodiments of the present invention also provide an apparatus for generating synthetic training data, the apparatus using the method of generating synthetic training data.

Some example embodiments provide a method of generating synthetic training data for motion recognition, the method being performed by a synthetic training data generation apparatus and including: generating a three-dimensional (3D) human body model in real time according to motion of a human body; converting volume data of the 3D human body model into a 3D linear structure and extracting skeletal joint information of a human body; generating a data set of a human body image and skeletal joint information by rendering the 3D human body model and the skeletal joint information; and providing the data set of the image and the skeletal joint information as synthetic training data for motion recognition.

The human body image may include one or more of a depth image and a color image.

The generating of the 3D human body model in real time according to motion of the human body may include generating a 3D human body model for each frame from images acquired from a plurality of depth cameras.

The depth cameras may include red green blue depth (RGB-D) sensors or depth sensors.

The generating of the data set of the human body image and the skeletal joint information by rendering the 3D human body model and the skeletal joint human body information may include generating a data set of an image and skeletal joint information using a rendering technique based on a depth map.

The generating of the data set of the human body image and the skeletal joint information by rendering the 3D human body model and the skeletal joint information may include generating a data set of a depth image and skeletal joint information by rendering the 3D human body model and the skeletal joint information in consideration of at least one of a camera position and a camera characteristic.

The generating of the data set of the human body image and the skeletal joint information by rendering the 3D human body model and the skeletal joint information may include rendering the 3D human body model and the skeletal joint information in consideration of at least one of texture of the human body model, a background image, a camera position, a lighting position, and a lighting type, and generating a data set of a color image and skeletal joint information.

The generating of the 3D human body model in real time according to motion of the human body may include generating a mesh using volume data derived from the images acquired using the plurality of depth cameras, and performing hole filling on the generated 3D mesh.

Other example embodiments provide an apparatus for generating synthetic training data for motion recognition, the apparatus including a processor and a memory configured to store at least one instruction executed by the processor and results of executing the instruction.

Here, the at least one instruction may include: an instruction for the processor to generate a 3D human body model in real time according to motion of a human body; an instruction for the processor to convert volume data of the 3D human body model into a 3D linear structure and extract skeletal joint information; an instruction for the processor to generate a data set of a human body image and skeletal joint information by rendering the 3D human body model and the skeletal joint information; and an instruction for the processor to provide the data set of the image and the skeletal joint information as synthetic training data for motion recognition.

The human body image may include one or more of a depth image and a color image.

Also, the instruction to generate the 3D human body model in real time according to motion of the human body may include an instruction to generate a 3D human body model for each frame from images acquired from a plurality of depth cameras.

Additionally, the instruction to generate the 3D human body model in real time according to motion of the human body may include an instruction to generate a mesh using volume data derived from the images acquired using the plurality of depth cameras, and an instruction to perform hole filling on the generated 3D mesh.

Meanwhile, the instruction to generate the data set of the human body image and the skeletal joint information by rendering the 3D human body model and the skeletal joint information may include an instruction to generate a data set of an image and skeletal joint information using a rendering technique employing a graphics-based depth map.

The instruction to generate the data set of the human body image and the skeletal joint information by rendering the 3D human body model and the skeletal joint information may also include an instruction to generate a data set of a depth image and skeletal joint information by rendering the 3D human body model and the skeletal joint information in consideration of at least one of a camera position and a camera characteristic.

Additionally, the instruction to generate the data set of the human body image and the skeletal joint information by rendering the 3D human body model and the skeletal joint information may include an instruction to generate a data set of a color image and skeletal joint information by rendering the 3D human body model and the skeletal joint information in consideration of at least one of texture of the human body model, a background image, a camera position, a lighting position, and a lighting type.

The apparatus for generating synthetic training data may further include a storage configured to store information or data such as the 3D human body model, a data set of a color image and skeletal joint information, and a data set of a depth image and skeletal joint information generated by the processor.

The apparatus for generating synthetic training data may further include a camera module including a plurality of cameras or sensors configured to acquire at least one of a color image and a depth image of the human body. The sensors may include multiple RGB-D sensors or depth sensors.

BRIEF DESCRIPTION OF DRAWINGS

Example embodiments of the present invention will become more apparent by describing in detail example embodiments of the present invention with reference to the accompanying drawings, in which.

DETAILED DESCRIPTION OF EXAMPLE EMBODIMENTS

Figure 1:
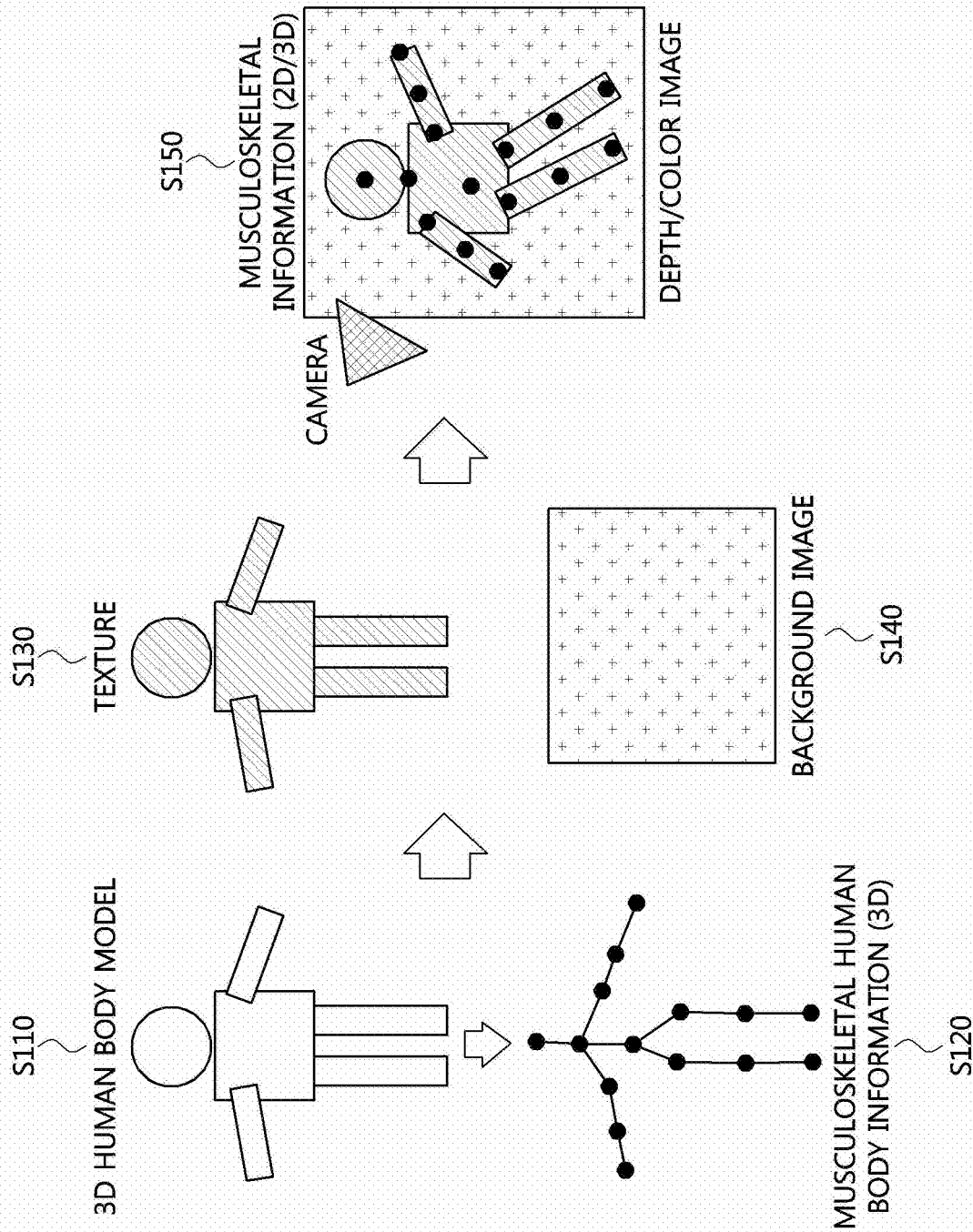
FIG. 1 conceptually shows a process of generating a data set of an image and skeletal joint information according to an example embodiment of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to limit the invention. As used herein, the singular forms "a", "an", and "the" are intended to include the plural forms as well, unless the context clearly indicates otherwise. It will be further understood that the terms "comprises", "comprising, ", "includes", and/or "including", when used herein, specify the presence of stated features, integers, steps, operations, elements, components, and/or groups thereof but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings.

The present invention proposes a method of performing, in a system for generating virtual data required for motion recognition using a depth image or a color image, the entire process on the basis of data acquired from a person's actual motion and generating a variety of virtual data at low costs.

FIG. 1 conceptually shows a process of generating a data set of an image and skeletal joint information according to an example embodiment of the present invention.

The present invention proposes a virtual data generation method in which a three-dimensional (3D) human body model and motion data are generated in real time using a plurality of depth cameras and a data set of a depth or color image and motion data which coincide with each other may be generated at low costs on the basis of the 3D human body model and motion data.

Referring to FIG. 1, an entire process for virtually generating a data set of a depth or color image and skeletal joint information is started for motion recognition training.

Referring to FIG. 1, a 3D human body model, skeletal joint information, texture, a background image, and a data set of an image and skeletal joint information may be sequentially generated with the synthetic training data generation method according to an example embodiment of the present invention.

More specifically, a 3D human body model is generated in real time for all frames according to a person's motion from images acquired by a camera employing multiple red green blue depth (RGB-D) sensors or a plurality of depth sensors (S110). Object images acquired by the camera employing the RGB-D sensors or depth sensors include a pair of two-dimensional (2D) images. One of the pair of 2D images may be a color image having standard RGB values, and the other may be a depth image in which each pixel is indicated by a grayscale value. A representative example of an RGB-D sensor may be the Microsoft Kinect sensor.

Subsequently, 3D skeletal joint information is extracted in real time from all the frames on the basis of the 3D human body model (S120). It is possible to change clothes of the human body model using various kinds of texture so as to generate a variety of data on the basis of the generated human body model and skeletal joint information (S130). Additionally, depth image data does not require any background while color image data may require data of various backgrounds. Therefore, it is possible to select a background image for the color image (S140) so that a variety of data may be generated accordingly.

The camera for acquiring a depth or color image is set at any position as shown in FIG. 1, and a data set of a depth image and skeletal joint information may be acquired using a rendering technique employing a graphics-based depth map (S150). A data set of a color image and skeletal joint information may be acquired using a 3D graphics rendering technique. It is possible to generate as much desired data as necessary while changing a characteristic and the position of the camera.

Rendering refers to a process of generating an image from models (or a file of a scene in which the models are gathered) by means of a computer program. One scene file contains objects in a strictly defined language or data structure and may include geometry, viewpoint, texture mapping, lighting, and shading information as a description of the virtual scene. The data included in the scene file is processed by a rendering program so that a digital image or raster graphics image file may be generated as an outcome. A graphics processing unit (GPU) assists a central processing unit (CPU) in performing complex rendering calculations.

Figure 2:
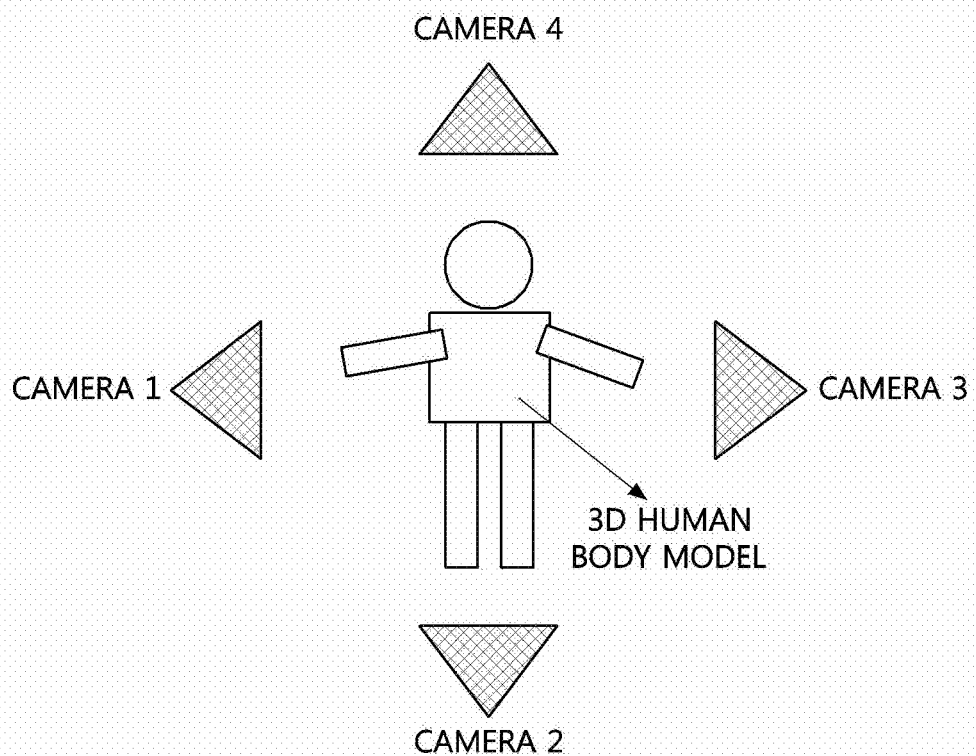
FIG. 2 is a conceptual diagram of a method of generating a three-dimensional (3D) human body model according to an example embodiment of the present invention.

FIG. 2 is a conceptual diagram of a method of generating a 3D human body model according to an example embodiment of the present invention.

A system for generating a 3D human body model and motion data using multiple depth cameras is shown in FIG. 2. FIG. 2 shows an environment in which four cameras are used to construct a 3D human body model from depth information of the cameras. The number of cameras used may be changed, and the used cameras may have been calibrated.

A method of generating a mesh using volume data according to a marching cube algorithm like KinectFusion based on GPU acceleration is used to generate a 3D human body model according to an example embodiment of the present invention. To obtain a depth image in a subsequent 3D rendering process, the human body model should not have any hole. Even when a plurality of depth cameras are used, however, numerous holes exist in depth data due to self-occlusion or characteristics of the depth cameras. Therefore, a hole-filling algorithm based on GPU acceleration is used so that a 3D human body model may be generated in real time.

Even when GPU acceleration is applied to all processes, it may not be possible to generate a human body model in real time due to a large amount of computation. In this case, a resolution of volume data may be adjusted. A human body model constructed at a low volume resolution has less details but is sufficient to generate virtual depth information data. When it is necessary to maintain the resolution, a plurality of GPUs may be used to perform computation in a distributed manner in units of frames. Then, it is possible to generate a human body model with a high resolution in real time.

Figure 3:
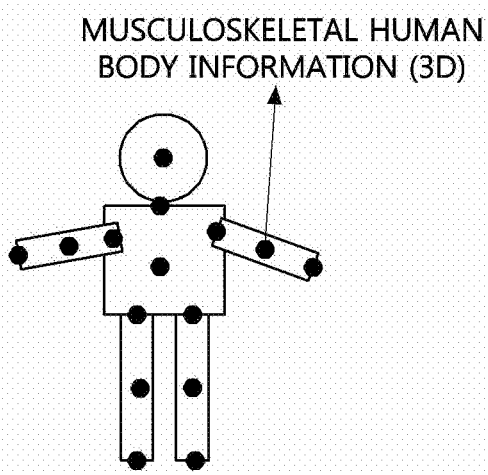
FIG. 3 shows human body skeletal joint coordinate information extracted using a 3D extraction method of skeletal joints of a human body according to an example embodiment of the present invention.

FIG. 3 shows human body skeletal joint coordinate information extracted using a 3D extraction method of skeletal joints of a human body according to an example embodiment of the present invention.

In the present invention, skeletal joint information is not extracted from depth data or point clouds of a plurality of cameras, but is extracted from the 3D human body model which is generated in real time according to the above-described procedure. 3D coordinate information of the extracted skeletal joints of a human body is shown in FIG. 3.

Volume data of a 3D human body model according to an example embodiment of the present invention includes data of implicit shape representation such as a signed distance function (SDF). When the implicit shape representation data is thinned or a 3D distance map is extracted, the volume data may be converted into a 3D linear structure. 3D skeletal joint information may be extracted by applying skeletal joint characteristic information of general human bodies to the obtained 3D linear structure.

The skeletal joint information may include joints of a human being and positions of major bones related to motion of the body. Skeletal information of an arm may include a hand point, a wrist point, an elbow point, and a shoulder point, and skeletal information of a leg may include a foot point, an ankle point, a knee point, and a hip point. Other skeletal information may include a head point, a middle point between shoulders, a spine point, and a middle point between hips.

Figure 4:
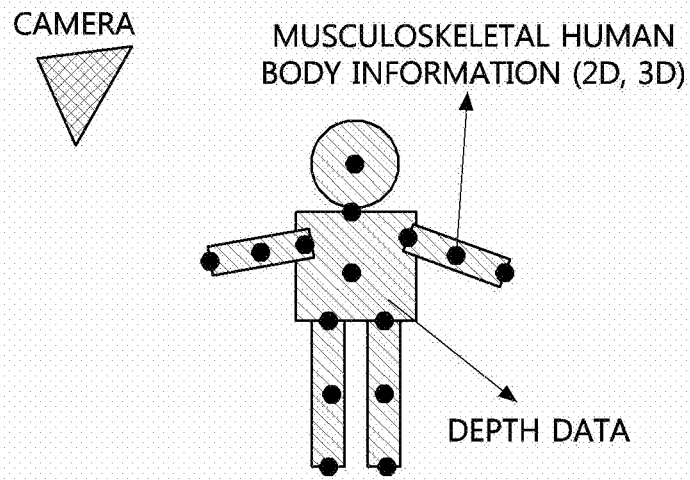
FIG. 4 shows a data set of a depth image and skeletal joint information according to an example embodiment of the present invention.
Figure 5:
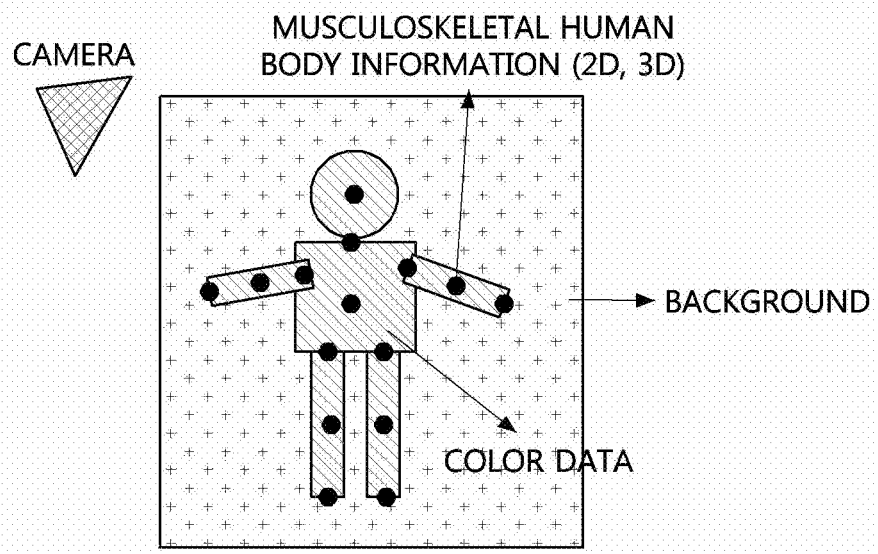
FIG. 5 shows a data set of a color image and skeletal joint information according to an example embodiment of the present invention.

FIGS. 4 and 5 show a data set of an image and skeletal joint information generated using a method of generating synthetic training data according to an example embodiment of the present invention. FIG. 4 shows a data set of a depth image and skeletal joint information, and FIG. 5 shows a data set of a color image and skeletal joint information.

When a rendering technique with a graphics depth buffer is used, it is possible to acquire a data set of a depth image and skeletal joint information suited for any camera position and camera characteristics from the previously generated 3D human body model and 3D skeletal joint information.

Also, when a camera position, a lighting position and type, a background image, texture of the human body model, etc. are selected, it is possible to acquire a desired data set of a color image and skeletal joint information using a 3D graphics rendering technique. To simulate data captured from an actual environment, noise may be added to the human body model, the background, and the like.

In general, one data set is composed of depth information or color information of any camera viewpoint and 2D or 3D joint information of human beings and used as training data for motion recognition.

Meanwhile, a process of performing texture mapping on a 3D human body model requires much time and efforts of a skilled designer. Texture mapping is a technique for defining detailed texture or color information on a surface of a virtual 3D object in the computer graphics field. Generally, a numerical expression or a 2D picture is applied to the surface of a 3D object in various ways, and during generation of a computer graphics scene, details of the surface are defined so that the 3D object may be perceived like a real object.

In an initial stage of general texture mapping, a mesh structure of a 3D human body model is not changed within one motion data set, that is, consecutive frames, and the model has been rigged. When motion data is applied to such a human body model, consecutive frames in which the human body model moves may be generated. Here, rigging may denote a process of creating a skeleton and muscles for each modeled object. The corresponding object or character may move through a rigging operation.

When a UV map of a human body model and texture corresponding thereto are generated in the initial stage of texture mapping, UV mapping is automatically performed in consecutive frames. Here, the UV mapping is a modeling process of constructing a 3D model from a 2D picture. In this specification, for convenience, the UV mapping is referred to as texture mapping. This process may be used when the above-described human body model and motion data are provided.

Since a mesh structure of a human body model restored in real time from a plurality of cameras is changed at every frame, it is necessary to generate a UV map and texture at every frame. However, this process takes much time and efforts, and performing the process at every frame is not appropriate for the aim of the present invention which is to generate a large amount of training data.

Figure 6:
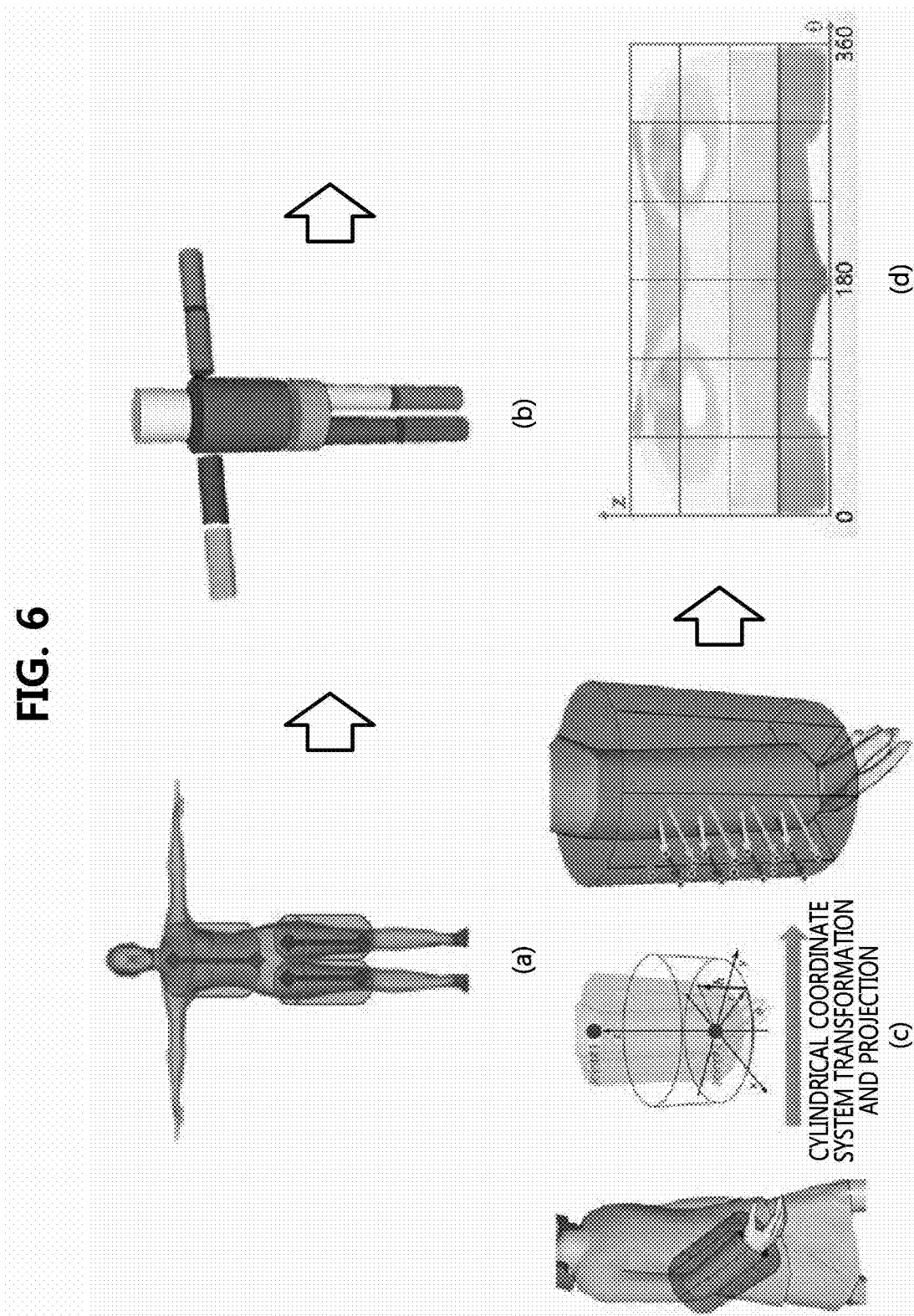
FIG. 6 shows a process of mapping texture to a human body model according to an example embodiment of the present invention.

FIG. 6 shows a process of mapping texture to a human body model according to an example embodiment of the present invention.

In texture mapping according to an example embodiment of the present invention, first a T-posed human body model is generated (a). Subsequently, the human body model is mapped to a cylinder model on the basis of skeletal joint information previously extracted according to an example embodiment of the present invention (b). When the cylinder model is provided, a UV map and texture corresponding to the cylinder model are generated through a cylindrical coordinate system transformation and projection (c and d), and applied to subsequent frames. Here, a structure of the cylinder model (a cylinder length and a cylinder diameter) may slightly vary according to skeletal joint information of a subsequent frame, and the UV map also may slightly vary accordingly.

In texture mapping according to an example embodiment of the present invention, the UV map is not generated according to a general procedure, but rather, body parts are sufficiently spaced apart from each other when the UV map is generated, and texture of each body part region may be generated to be larger than the actual size of the body part region when texture is generated for the T-pose. According to this method, even when the UV map slightly varies, it is possible to apply desired texture to each body part region. According to such an example embodiment of the present invention, precise patches of texture, which coincide with each other between frames like in a general animation, are not applied, but it is possible to apply desired texture by generating a UV map and the texture only once. Since the present invention is intended to generate various data sets required for training, it is possible to compromise texture quality to a certain degree compared to texture mapping applied to animations.

Figure 7:
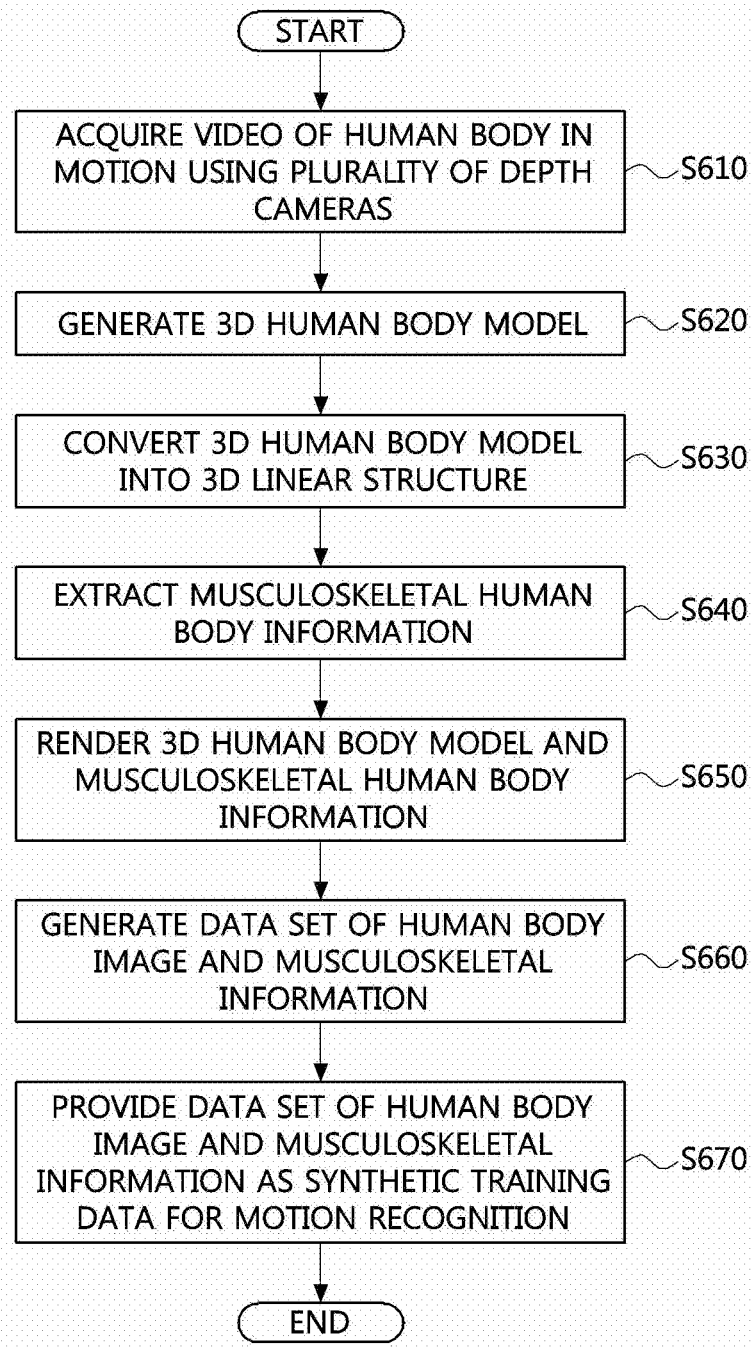
FIG. 7 is a flowchart of a method of generating synthetic training data according to an example embodiment of the present invention.

FIG. 7 is a flowchart of a method of generating synthetic training data according to an example embodiment of the present invention.

The method of generating synthetic training data illustrated in FIG. 7 may be performed by an apparatus for generating synthetic training data according to an example embodiment of the present invention.

First, the apparatus for generating synthetic training data acquires in real time a video of a human body in motion using a plurality of depth cameras (S610) and generates a 3D human body model in real time according to motion of the human body (S620).

Specifically, in the operation of generating a 3D human body model, a mesh is generated using volume data derived from images which are acquired using the plurality of depth cameras, and a 3D human body model is generated by performing hole filling on the generated 3D mesh.

When the 3D human body model is finished, volume data of the 3D human body model is converted into a 3D linear structure (S630), and skeletal joint information is extracted (S640).

Subsequently, the 3D human body model and the skeletal joint information are rendered (S650), and a data set of a human body image and skeletal joint information may be generated (S660).

The data set of a human body image and skeletal joint information may be generated using a rendering technique employing a graphics-based depth map.

Also, the 3D human body model and the skeletal joint information are rendered in consideration of at least one of texture of the human body model, a background image, a camera position, a lighting position, and a lighting type, and a data set of a color image and skeletal joint information may be generated.

The generated data set of an image and skeletal joint information is provided as synthetic training data for motion recognition (S670).

Figure 8:
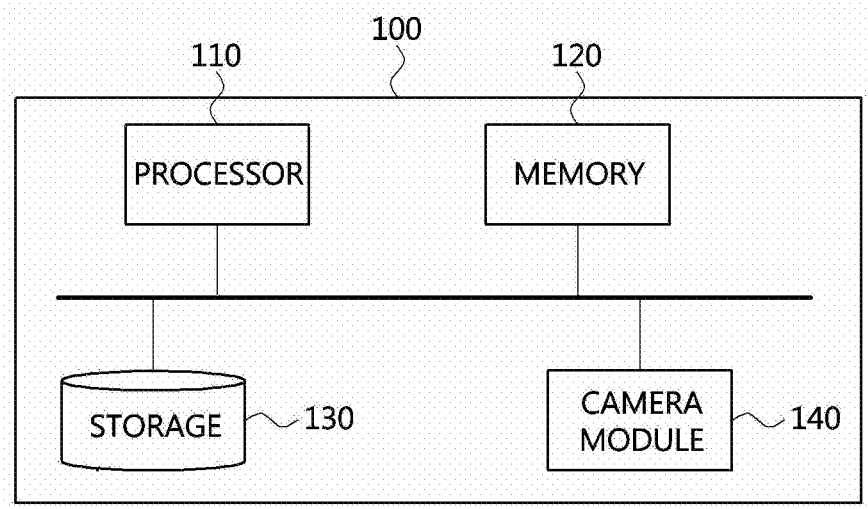
FIG. 8 is a block diagram of an apparatus for generating synthetic training data according to an example embodiment of the present invention.

FIG. 8 is a block diagram of an apparatus for generating synthetic training data according to an example embodiment of the present invention.

An apparatus 100 for generating synthetic training data according to an example embodiment of the present invention may include a processor 110, a memory 120 configured to store at least one instruction executed by the processor 110 and results of executing the instruction, a storage 130, and a camera module 140. Meanwhile, the processor 110 may include a CPU and a GPU.

The at least one instruction may include an instruction for the processor 110 to generate a 3D human body model in real time according to motion of a human body, an instruction for the processor 110 to convert volume data of the 3D human body model into a 3D linear structure and extract skeletal joint information, an instruction for the processor 110 to generate a data set of a human body image and skeletal joint information by rendering the 3D human body model and the skeletal joint information, and an instruction for the processor 110 to provide the data set of the image and the skeletal joint information as synthetic training data for motion recognition.

The human body image may include one or more of a depth image and a color image.

Also, the instruction to generate the 3D human body model in real time according to motion of the human body may include an instruction to generate a 3D human body model for each frame from images acquired from a plurality of depth cameras.

Additionally, the instruction to generate the 3D human body model in real time according to motion of the human body may include an instruction to generate a mesh using volume data derived from the images acquired using the plurality of depth cameras, and an instruction to perform hole filling on the generated 3D mesh.

Meanwhile, the instruction to generate the data set of the human body image and the skeletal joint information by rendering the 3D human body model and the skeletal joint information may include an instruction to generate a data set of an image and skeletal joint information using a rendering technique employing a graphics-based depth map.

The instruction to generate the data set of the human body image and the skeletal joint information by rendering the 3D human body model and the skeletal joint information may also include an instruction to generate a data set of a depth image and skeletal joint information by rendering the 3D human body model and the skeletal joint information in consideration of at least one of a camera position and a camera characteristic.

Additionally, the instruction to generate the data set of the human body image and the skeletal joint information by rendering the 3D human body model and the skeletal joint information may include an instruction to generate a data set of a color image and skeletal joint information by rendering the 3D human body model and the skeletal joint information in consideration of at least one of texture of the human body model, a background image, a camera position, a lighting position, and a lighting type.

Meanwhile, the storage 130 may store information or data including the 3D human body model, the data set of the color image and the skeletal joint information, the data set of the depth image and the skeletal joint information, and the like generated by the processor 110.

Additionally, the camera module 140 may include a plurality of cameras or sensors which acquire at least one of a color image and a depth image of the human body. The sensors may include multiple RGB-D sensors or depth sensors.

As described above, for the purpose of generating a virtual data set of a depth or color image and skeletal joint information for motion recognition, the present invention proposes a method of generating virtual data by constructing a 3D human body model in real time and extracting skeletal joint information from the constructed human body model rather than a method of using a constructed 3D human body model and motion data.

According to the present invention, a 3D human body model is generated in real time at every frame using a plurality of RGB-D cameras or a plurality of depth cameras while a person is moving, and skeletal joint information is extracted from all the frames. Therefore, it is possible to remove all processes of generating a virtual human body model, acquiring motion data through motion capture (Mo-Cap), and moving the model through motion retargeting. Also, it is possible to acquire a variety of data of persons wearing various clothes compared to a case in which a virtual human body model is used.

According to the above-described example embodiments of the present invention, it is possible to remove procedures, such as generating a virtual human body model, acquiring motion data, and motion retargeting, which are required for an existing method of generating training data using a previously generated virtual 3D human body model and motion data.

Also, according to the example embodiments of the present invention, it is possible to acquire a variety of data of persons wearing various clothes compared to a case in which a virtual human body model is used.

Operation of a method according to an example embodiment of the present invention may be implemented as a computer-readable program or code in a computer-readable recording medium. The computer-readable recording medium includes all types of recording devices in which data that may be read by a computer system is stored. Also, the computer-readable recording medium may be distributed among computer systems connected via a network such that the computer-readable program or code may be stored and executed in a decentralized manner.

The computer-readable recording medium may include a hardware device specially configured to store and perform program instructions, such as a read-only memory (ROM), a random access memory (RAM), a flash memory, and the like. The program instructions may include not only a machine language code generated by a compiler but also a high level language code that may be executed by a computer using an interpreter and the like.

Some aspects of the present invention have been described in the context of an apparatus, but may also represent the corresponding method. Here, a block or the apparatus corresponds to a step of the method or a characteristic of a step of the method. Likewise, aspects which have been described in the context of the method may be indicated by the corresponding blocks or items or characteristics of the corresponding apparatus. Some or all of steps of the method may be performed by (or using) a hardware device, such as a microprocessor, a programmable computer, or an electronic circuit. In some embodiments, one or more of important steps of the method may be performed by such a device.

In example embodiments, a programmable logic device (e.g., a field-programmable gate array (FPGA)) may be used to perform some or all of functions of the above-described methods. In example embodiments, the FPGA may operate in combination with a microprocessor for performing one of the above-described methods. In general, the methods may be performed by any hardware device.

While the exemplary embodiments of the present invention have been described above, those of ordinary skill in the art should understood that various changes, substitutions and alterations may be made herein without departing from the spirit and scope of the present invention as defined by the following claims.

What is claimed is:

1. A method of generating synthetic training data for motion recognition, the method being performed by a synthetic training data generation apparatus and comprising:
    generating a three-dimensional (3D) human body model in real time according to motion of a human body;
    converting volume data of the 3D human body model into a 3D linear structure and extracting skeletal joint information;
    generating a data set of a human body image and skeletal joint information by rendering the 3D human body model and the skeletal joint information; and
    providing the data set of the human body image and the skeletal joint information as synthetic training data for motion recognition,
    wherein the generating of the data set of the human body image and the skeletal joint information by rendering the 3D human body model and the skeletal joint information comprises:
    generating the 3D human body model in T-pose;
    mapping the human body model in T-pose to a cylinder model; and
    generating a UV map and texture corresponding to the cylinder model and performing texture mapping, and
    wherein the UV map is generated by a modeling process of constructing a 3D model from a 2D picture.

2. The method of claim 1, wherein the human body image includes one or more of a depth image and a color image.

3. The method of claim 1, wherein the generating of the 3D human body model in real time according to motion of the human body comprises generating a 3D human body model for each frame from images acquired from a plurality of depth cameras.

4. The method of claim 3, wherein the depth cameras include red green blue depth (RGB-D) sensors or depth sensors.

5. The method of claim 1, wherein the generating of the data set of the human body image and the skeletal joint information by rendering the 3D human body model and the skeletal joint information comprises generating a data set of an image and skeletal joint information using a rendering technique based on a depth map.

6. The method of claim 1, wherein the generating of the data set of the human body image and the skeletal joint information by rendering the 3D human body model and the skeletal joint information comprises generating a data set of a depth image and skeletal joint information by rendering the 3D human body model and the skeletal joint information in consideration of at least one of a camera position and a camera characteristic.

7. The method of claim 1, wherein the generating of the data set of the human body image and the skeletal joint information by rendering the 3D human body model and the skeletal joint information comprises rendering the 3D human body model and the skeletal joint information in consideration of at least one of texture of the human body model, a background image, a camera position, a lighting position, and a lighting type, and generating a data set of a color image and skeletal joint information.

8. The method of claim 3, wherein the generating of the 3D human body model in real time according to motion of the human body comprises:
    generating a mesh using volume data derived from the images acquired using the plurality of depth cameras; and
    performing hole filling on the generated 3D mesh.

9. The method of claim 1, wherein the UV map and the texture are generated so that a distance between body parts is a certain value or more and texture for each body part region is generated to be larger in size than an actual body part.

10. An apparatus for generating synthetic training data for motion recognition, the apparatus comprising:
    a processor; and
    a memory configured to store at least one instruction executed by the processor,
    wherein the at least one instruction includes:
    an instruction to generate a three-dimensional (3D) human body model in real time according to motion of a human body;
    an instruction to convert volume data of the 3D human body model into a 3D linear structure and extract skeletal joint information;
    an instruction to generate a data set of a human body image and skeletal joint information by rendering the 3D human body model and the skeletal joint information; and
    an instruction to provide the data set of the human body image and the skeletal joint information as synthetic training data for motion recognition,
    wherein the instruction to generate the data set of the human body image and the skeletal joint information by rendering the 3D human body model and the skeletal joint information comprises:
    generate the 3D human body model in T-pose;
    map the human body model in T-pose to a cylinder model; and
    generate a UV map and texture corresponding to the cylinder model and performing texture mapping, and
    wherein the UV map is generated by a modeling process of constructing a 3D model from a 2D picture.

11. The apparatus of claim 10, wherein the human body image includes one or more of a depth image and a color image.

12. The apparatus of claim 10, wherein the instruction to generate the 3D human body model in real time according to motion of the human body comprises an instruction to generate a 3D human body model for each frame from images acquired from a plurality of depth cameras.

13. The apparatus of claim 12, wherein the depth cameras include red green blue depth (RGB-D) sensors or depth sensors.

14. The apparatus of claim 10, wherein the instruction to generate the data set of the human body image and the skeletal joint information by rendering the 3D human body model and the skeletal joint information comprises an instruction to generate a data set of an image and skeletal joint information using a rendering technique based on a depth map.

15. The apparatus of claim 10, wherein the instruction to generate the data set of the human body image and the skeletal joint information by rendering the 3D human body model and the skeletal joint information comprises an instruction to generate a data set of a depth image and skeletal joint information by rendering the 3D human body model and the skeletal joint information in consideration of at least one of a camera position and a camera characteristic.

16. The apparatus of claim 10, wherein the instruction to generate the data set of the human body image and the skeletal joint information by rendering the 3D human body model and the skeletal joint information comprises an instruction to generate a data set of a color image and skeletal joint information by rendering the 3D human body model and the skeletal joint information in consideration of at least one of texture of the human body model, a background image, a camera position, a lighting position, and a lighting type.

17. The apparatus of claim 12, wherein the instruction to generate the 3D human body model in real time according to motion of the human body comprises:
   an instruction to generate a mesh using volume data derived from the images acquired using the plurality of depth cameras; and
   an instruction to perform hole filling on the generated 3D mesh.

18. The apparatus of claim 10, further comprising a storage configured to store at least one of the 3D human body model, a data set of a color image and skeletal joint information, and a data set of a depth image and skeletal joint information generated by the processor.

19. The apparatus of claim 10, further comprising a camera module including a plurality of cameras configured to acquire at least one of a color image and a depth image.

* * * * *